United States Patent [19]

DeHority

[11] Patent Number: 5,129,639
[45] Date of Patent: Jul. 14, 1992

[54] PRINTER CONFIGURATION CONTROL SYSTEM

[75] Inventor: John W. DeHority, Rochester, N.Y.

[73] Assignee: Eastman Kodak Company, Rochester, N.Y.

[21] Appl. No.: 628,309

[22] Filed: Dec. 17, 1990

[51] Int. Cl.$^5$ .............................................. B41F 13/54
[52] U.S. Cl. ........................ 270/1.1; 270/37; 270/53; 270/58; 355/311
[58] Field of Search .................. 270/1.1, 37, 53, 58, 270/52; 271/9, 259, 258; 355/311, 313, 314, 321-326

[56] References Cited

U.S. PATENT DOCUMENTS

| | | | |
|---|---|---|---|
| 4,260,248 | 4/1981 | Murata | 355/311 |
| 4,265,440 | 5/1981 | Shibazaki et al. | |
| 4,393,375 | 7/1983 | Sugiura et al. | |
| 4,406,537 | 9/1983 | Mori | |
| 4,754,303 | 6/1988 | Ho | 355/324 |
| 4,763,889 | 8/1988 | Dei et al. | |
| 4,796,056 | 1/1989 | Ito | |
| 4,862,220 | 8/1989 | Ho | 355/311 |
| 4,878,656 | 11/1989 | Honjo | 270/53 |
| 4,908,672 | 3/1990 | Ito | |
| 5,006,895 | 4/1991 | Hashimoto | 355/311 |
| 5,031,116 | 7/1991 | Shukunami | 355/311 |

FOREIGN PATENT DOCUMENTS

| | | | |
|---|---|---|---|
| 3523819A | 1/1986 | Fed. Rep. of Germany | 355/311 |
| 209472 | 9/1987 | Japan | 355/311 |
| 288861 | 12/1987 | Japan | 355/311 |
| 210971 | 8/1989 | Japan | 355/311 |

Primary Examiner—Edward K. Look
Assistant Examiner—Therese M. Newholm
Attorney, Agent, or Firm—Mark Z. Dudley

[57] ABSTRACT

The present invention is a system which compares the print job requirements to the printer capability and determines the best match therebetween. When a mismatch occurs, the system determines the best match between size, color, weight and type by determining a mismatch magnitude between the job paper requirements and the printer's paper capabilities or stocks. The paper with the lowest mismatch magnitude is designated. The system also determines the best match between the job requirements and the printer capability for stapling, folding, duplexing and stacking. The operator is given an opportunity to correct any mismatches and the best match is used to configure the printer for the job if the user has specified a best match print strategy.

2 Claims, 4 Drawing Sheets

PRINTER CONFIGURATION CONTROL SYSTEM

BACKGROUND OF THE INVENTION

I. Field of the Invention

The present invention is directed to a system which automatically controls a reconfigurable printer based on the user's print job requirements and, more particularly, to a system that will provide the best match to a user's print job requirements when an exact match does not exist.

Description of the Related Art

Today high speed printers are commonly being shared among many users over a local area network. In such situations, the user, when requesting that a job be printed, does not know the current configuration of the printer since it is usually located at some distance remotely from the user's work area. In a typical situation, the user sends the print job to the printer and at some later time, the user receives an indication of whether the job was printed. If the job has not been printed because the print job requirements cannot be met by the printer, for example, when the user requests a blue cover for his report and only red covers are loaded in the printer cover tray, the user is informed of the failure and can be informed about the reason for the failure. The user must then reschedule the print job. However, before rescheduling the print job, the user, in cases where the user was not informed of the reason for failure, must call the printer operator to determine the reason for the job failure and request that the operator change the paper to the proper color or if the proper color is not available, change the print job requirements to match the current configuration of the printer. Such systems exhibit no flexibility and often waste the time of the user since, in many cases, the user would have accepted a mismatch to his printing requirements and would have continued the printing job rather than stopping the job all together. A solution to this type of problem is for the printer operator to specify paper stocks which are considered to be interchangeable. In such a situation, when the print job encounters a mismatch, he interchangeable paper is selected. U.S. Pat. No. 4,763,889 by Dei et al. addresses the problem of paper outages in one tray enabling an automatic switch to an alternate tray declared "equivalent" by an operator's action. This features could provide a solution to the need for specified interchangeable paper stocks, but is also inflexible because if a mismatch to the user's request also exists for the interchangeable paper stocks, the print job is then rejected. Further problems occur when the user requires a particular type of stapling or other paper handling requirement and that type of paper handling capability does not exist in the printer. The prior art typically rejects the print job even in situations where even less important job requirements than paper color such as for folding, stapling, duplexing, stacking and folding do not match the printer configuration capability. What is needed is a system that will allow the user to indicate to the printer that the closest match to the print job requirements should be used rather than rejecting the job completely.

SUMMARY OF THE INVENTION

It is an object of the present invention to allow the user to specify that the print job should continue with the best match between the print job requirements and the printer capabilities.

It is also an object of the present invention to provide a system that will determine the best match between the printer capabilities and the print job requirements.

It is a further object of the present invention to provide a printing system that will not reject print jobs for mismatches.

It is an additional object of the present invention to provide a print job-printer capability matching procedure which will match jobs with printer capability.

The above objects can be attained by a system that compares the print job requirements to the printer capability and provides the best possible match therebetween. In such a system when a mismatch occurs, the system provides the best match between paper size, paper color, paper weight and paper type, such as plain or hole punched by determining a mismatch magnitude between the job requirements and the printer's paper capabilities or stocks. The paper with the lowest mismatch magnitude is selected. The system also selects the best match between the job requirements and the printer capability for stapling, folding, duplexing and stacking.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
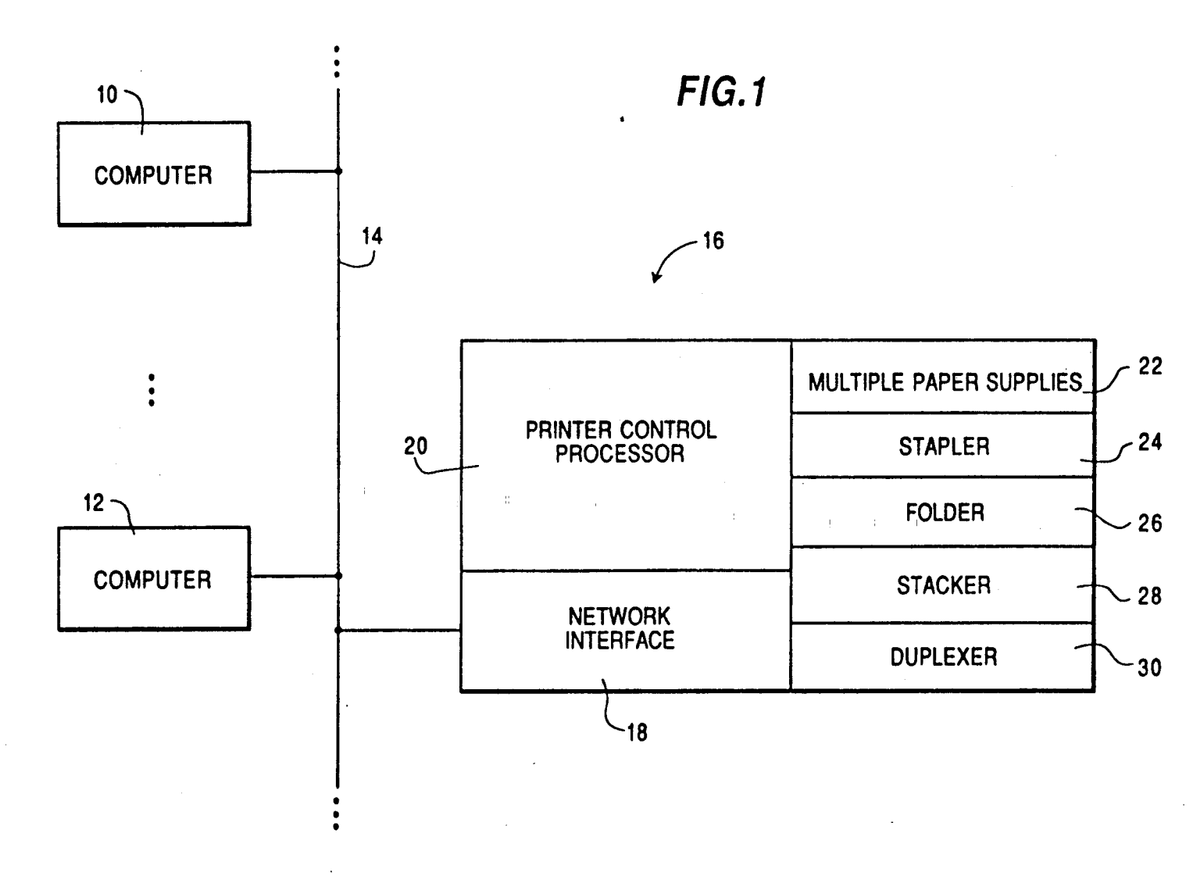
FIG. 1 illustrates an equipment configuration in accordance with the present invention.

The present invention is embodied in a system in which multiple users at various computers 10 and 12, located at some distance or remotely from the printer, send print jobs over a conventional local area network 14, such as an Ethernet, to a conventional printer 16 such as a Kodak Ektaprint 1392 Model 24 printer, as illustrated in FIG. 1. This printer 16 includes a network interface 18 for receiving the print job and supplying the print job to a printer control processor (raster image processor) 20, such as the 1492 series of raster image processors available from Kodak. The printer control processor 20 is a program controlled device which, based on the print job requirement, selects paper supplies from a multiple paper supply system 22, where each supply indicates to the processor the size of the paper while the operator indicates paper weight, color and type for each supply, selects a stapler configuration for a stapler 24, selects a folder capability for a folder 26, determines a stacker specification for a stacker 28 and controls a duplexer 30 to provide duplexing if necessary and controls the actual marking engine. In this way, the printer control processor controls the print job to produce the printed document as desired by the user. The control program is generally stored in a ROM and is called firmware. The present invention involves additions to the control program or firmware. These additions can be made by a person of ordinary skill in the art using the description herein which includes pseudocode representations of the additions.

The present invention preferably uses a document specification or document header which precedes the actual print jobs, such as a header specified using the Abode Document Structuring Convention 3.0. A document specified in accordance with this convention will include a document header such as:

%!PS-Adobe-3.0
%%Document_Media:body_paper_tag X Y W C T
%%+cover_tag X Y W C T
%%+tabs_tag . . .
%%Requirements:Duplex Jog Staple
%%+fold(saddle)
%%+numcopies(n)
%%+collate
%%Proof_Mode:Substitute
%%Job_Identification (title, user, etc.)
%%End_Comments This specification specifies each of the paper types to be used in the print job including the X and Y paper dimensions in 72ths of an inch, weigh W expressed in grams per square meter, paper color (C) and paper type (T). A typical body paper tag would read "612 792 75 white plain" indicating the X dimension as 612, the Y dimension as 792, the weight is 75, the color as white and the type as plain. The document media can also include specifications for a cover, tabs and other paper requirements. In addition to paper requirements, the conventions allow the specification of other job "Requirements" such as duplex printing, different types of stacking such as jog positions, stapling positions such as left, right, saddle, top, middle and bottom along with multiple folding capabilities such as Z fold, gate fold, right gate fold, left gate fold and letter fold. The Requirements also provide the ability to specify the number of copies and whether collation should be performed. This convention also allows the user to indicate whether a substitute for the job requirements is allowed. Through the Proof Mode the specification allows the user to indicate that the printer should use the best match strategy by specifying "Substitute" or the strict requirements strategy by specifying "Notify Me". Typically, the user would be able to complete such a specification by using a print job specification menu on the users computer which allows selection from all the possible printer configurations, that is, a generic printer configuration.

Figure 2A:
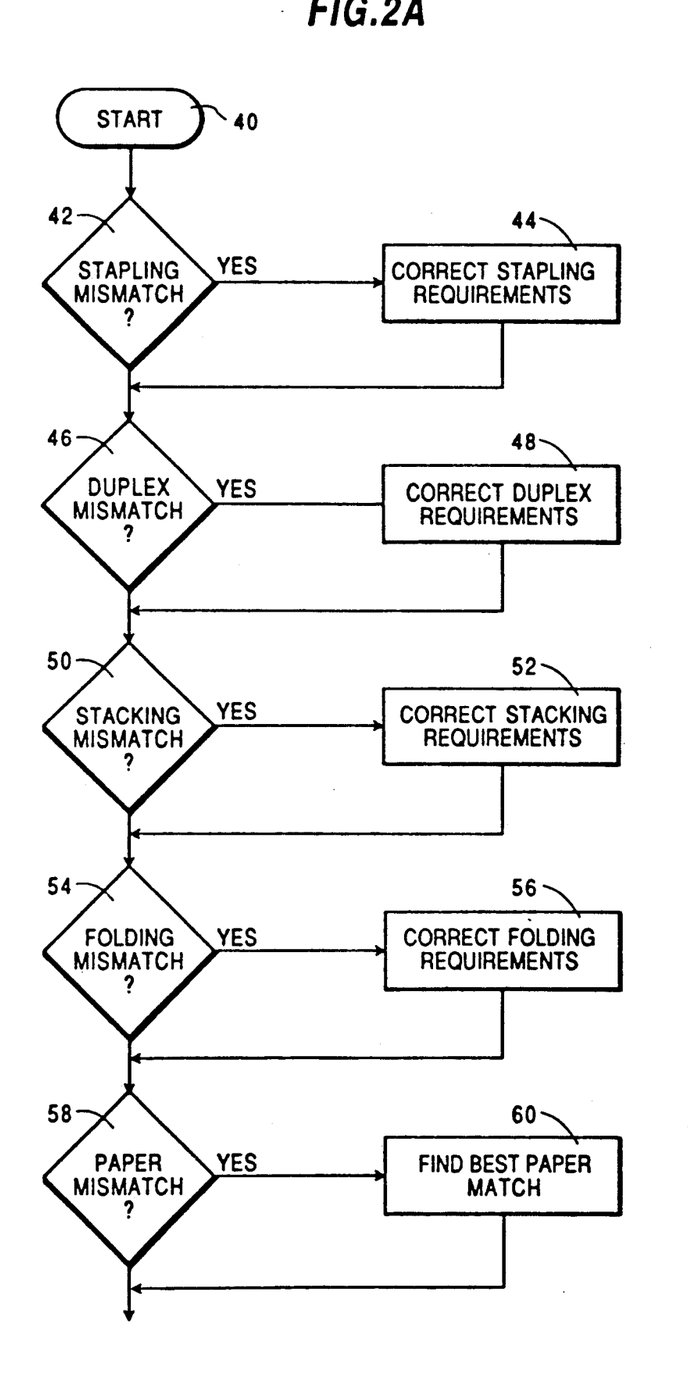
FIGS. 2A and 2B illustrate the procedure performed by the printer control processor of FIG. 1.
Figure 2B:
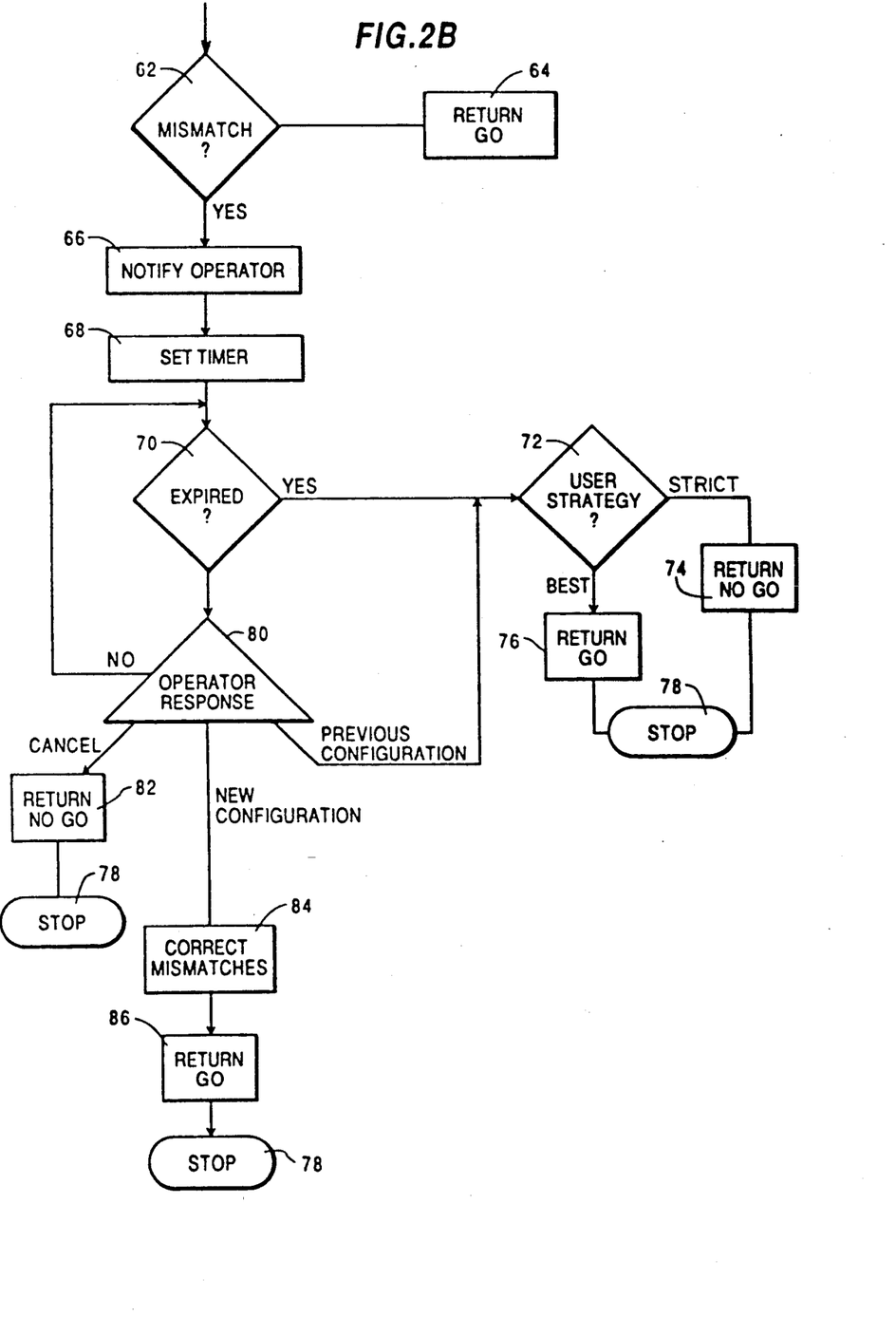
Figure 3A:
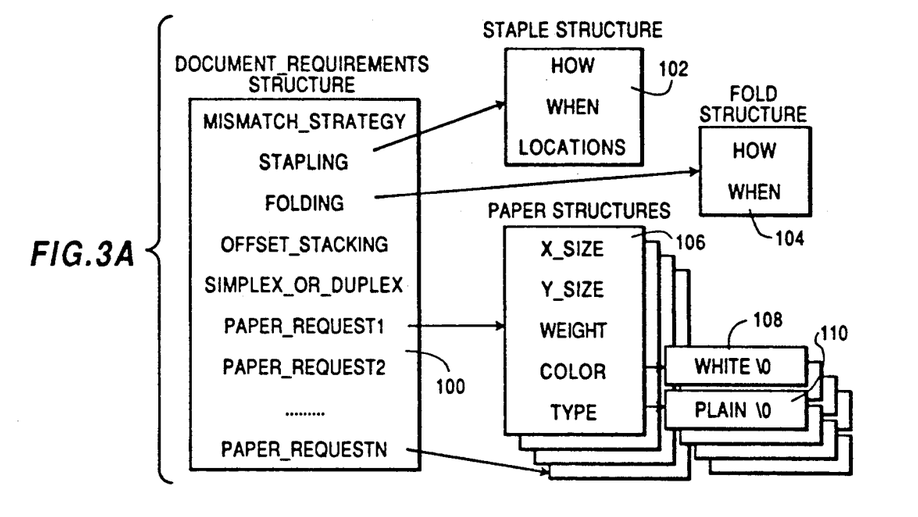
FIGS. 3A and 3B illustrate data structures associated with determining a match between print job requirements and printer capabilities.
Figure 3B:
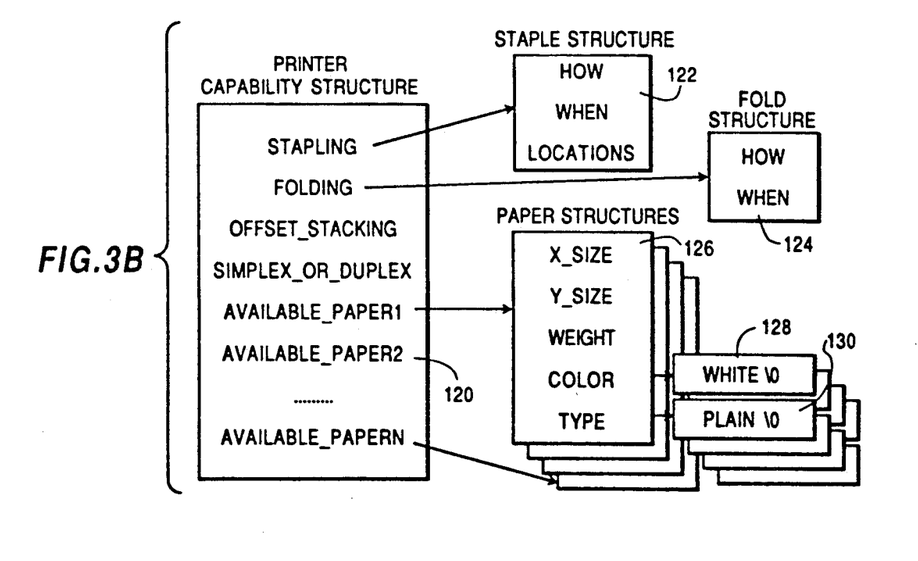

The present invention performs automatic printer configuration in accordance with the procedure illustrated in FIGS. 2A and 2B. This procedure will be discussed in more detail using pseudocode suitable for implementation in a language such as the preferred language "C" and with a compiler such as the Sun Microsystems C compiler. The automated job requirements and printer configuration matching procedure starts by determining 42 whether there is a stapling mismatch. If a stapling mismatch exists, the document requirements for stapling are corrected 44 to provide the best match between the job requirements and the printer capability. This is performed using document and printer configuration data structures, such as illustrated in FIGS. 3A and 3B and which will be discussed in more detail later. The document requirements data structure is loaded previously from the convention definition and then essentially what occurs is the document requirements data structure field contents of FIG. 3A for each mismatch is changed to match the marking engine capability data structure field contents of the printer illustrated in FIG. 3B. Next the system determined 46 whether there is a duplex requirement mismatch and corrects 48 the document duplex requirements to obtain a match if there is a mismatch. The system then determines 50 whether there is a stacking mismatch and performs an appropriate correction 52 followed by a similar determination 54 and correction 56 for a folding mismatch. The system then determines 58 whether there is a paper mismatch for each of the paper requirements specified in the document media portion of the document structuring header and finds 60 the best paper match. For each one of the tests 42, 46, 50, 54 and 58 if a mismatch exists, a mismatch flag is set. Once all the tests have been performed, the mismatch flag is examined 62 to determined whether any mismatch exists. If a mismatch does not exist, the system returns 64 with a printer GO indication. If a mismatch does occur, the printer operator is notified 66 of the characteristics of the mismatch and given an opportunity to change the printer configuration to match the requirements by for example, substituting blue paper for red paper when the printer requirements specify blue paper. Once the operator is notified, a timer is set 68 and then tested 72 to determine whether the time has expired. If the time has expired, the user's strategy is checked to determine whether the user wants a strict match to the document requirements or will allow a substitution of a printed document best matching the job requirements. If the user's strategy requires a strict match, the procedure 74 with a No Go indication while if the strategy is to use the best match between the job requirements and the printer capability, then the system returns 76 with a GO indication and the corrected document requirements data structure is used to configure the printer for the job. If the time has not expired and the operator has provided a response 80, the response is checked to determine how to proceed. If the operator's response is to cancel the job, the procedure returns 82 with a No Go indication. If the operator's response is to change the printer configuration, such as substituting blue for red paper, the system executed 84 the portion of the procedure discussed above with respect to steps 42–60 to correct 84 any remaining mismatches and returns 86 with a GO indication. If the operator does not change the configuration and indicated that the previous configuration should be used by signifying a printer GO indication, the procedure return 88 with a GO indication.

The procedure of the present invention are preferably arranged in a hierarchial execution structure where the top most or control procedure is named the resolve configuration mismatches procedure. This control procedure should be called whenever a new print job is received. However, prior to calling the control procedure a conventional parsing procedure should be executed to parse the document requirements specification of the header and load the document requirements structure to be discussed in more detail with respect to FIG. 3A. The top most procedure calls the testing and correction procedure for mismatches and also performs the operator notification and response operations previously discussed. The test and correct mismatch procedure is at the second highest level within the hierarchy and calls the procedures for testing and correcting, stapling, duplex, offset and folding mismatches. This test and correct configuration mismatches routine also calls a find matching paper routine which calls a routine at a further lower level which determines the best paper match. Each of these routines will be discussed in turn with respect to pseudocode appropriate for implementing the procedure in the "C" language.

The resolve configuration mismatches procedure is set forth below;

```
procedure
resolve_config_mismatches()
begin
  var
  mismatch_found: boolean;
  mismatch_found: =
  test_and_correct_config-
  uration_mismatches();
  if mismatch_found = TRUE then
  begin
    set an operator response timer;
    notify the operator of mismatch;
    wait for operator to correct
    configuration mismatch;
    if operator responds to mismatch
    before timer expires then
    case operator_response_type of
    CANCEL_JOB:
    return NO_GO
    NEW_CONFIGURATION:
    begin
    test_and_correct_config-
    uration_mismatches();
    return GO
    end;
    PREVIOUS_CONFIGURATION:
    if user's stragegy =
    DO_THE_BEST_YOU_CAN then
    return GO
    else
    return NO_GO
    end; (case)
    else {the timer expired}
    if user's strategy =
    DO_THE_BEST_YOU_CAN then
    return GO
    else {the document's
    requirements are strict}
    return NO_GO
  end; {mismatch_found = TRUE}
  else {no mismatch was found}
  return GO
end; {procedure resolve_config_mismatches}
```

This procedure first specifies the mismatch flag as a boolean variable and then calls the test and correct configuration mismatches procedure. This procedure returns with either a true or false for the mismatch found variable which is then tested. If a mismatch is not found, the resolve procedure returns with a GO as noted near the bottom of the pseudocode. If a mismatch is found then the operator timer is set to, for example, five minutes, the operator is notified and supplied with an indication of the types of mismatches, and a response from the operator is awaited. If the operator does respond with a "cancel job" then the system returns with a NO GO. If the operator responds indicating that the printer has been reconfigured, the system once again executes the test and correct configuration mismatches procedure and returns with a GO. If the operator indicates that the previous configuration should be used, or if the timer expires, the system returns with a GO or a NO GO depending upon the printer strategy specified by the user.

The test and correct configuration mismatch procedure called by the procedure discussed above is set forth below:

```
procedure
test_and_correct_configuration_mismatches()
{return a boolean value indicating
whether any configuration mismatch was
found}
begin
  var
  mismatch_found: boolean;
  best_match,
  desired_paper: paper_structure;
  (   )
  mismatch_found: = FALSE;
  (   )
  if is_staple_possible() = FALSE then
  mismatch_found: = TRUE;
  (   )
  if is_duplex_possible() = FALSE then
  mismatch_found: = TRUE;
  (   )
  if is_offset_possible() = FALSE then
  mismatch_found: = TRUE;
  (   )
  if is_folding_possible() = FALSE then
  mismatch_found: = TRUE;
  (   )
  for desired_paper in the set of requested
  paper types do
  begin
  best_match: =
  find_matching_paper (desired_paper);
  if best_match =
  NO_MATCHING_PAPER_FOUND then
  mismatch_found: = TRUE
  end;
  return mismatch_found
end; {procedure test_and_correct_config-
uration_mismatches}
```

This procedure first sets the mismatch found variable to false and then calls the staple duplex, offset, and folding mismatch determination routines which not only determine whether there is a mismatch but correct the mismatch for these print operation characteristics. The system then enters a loop which examines each requested paper type in the document specification and calls the best match routine to determine the best match for each of the types of paper while also testing to determine whether an exact match exists.

The procedure which determines whether there is a stapling mismatch and correct any such mismatch is illustrated below:

```
procedure
is_staple_possible()
begin
  if document_requirements.stapling =
  NO_STAPLES then
  return TRUE;
  if marking_engine_capability.stapling =
  NO_STAPLES then
  begin
  document_requirements.stapling
  : = NO_STAPLES;
  return FALSE
  end;
  {at this point we know we can at least put in a
  left staple}
  case document_requirements.stapling of
  RIGHT_STAPLE:
  if marking_engine_capa-
  bility.stapling
  does not include RIGHT_STAPLE
  then
```

```
-continued
begin
document_require-
ments.stapling : =
LEFT_STAPLE;
set flag for 180 degree
global image rotation;
return FALSE
end;
SADDLE_STAPLE:
if marking_engine_capa-
bility.stapling
does not include SADDLE_STAPLE
then
begin
document_require-
ments.stapling : =
NO_STAPLE;
return FALSE
end
MIDDLE_STAPLE:
if marking_engine_capab-
ility.stapling
does not include MIDDLE_STAPLE
then
begin
document_require-
ments.stapling : =
NO_STAPLE;
return FALSE
end
TOP_STAPLE:
if marking_engine_capab-
ility.stapling
does not include TOP_STAPLE then
begin
document_require-
ments.stapling : =
NO_STAPLE;
return FALSE
end
BOTTOM_STAPLE:
if marking_engine_capab-
ility.stapling
does not include BOTTOM_STAPLE
then
begin
if marking_engine_capa-
bility.stapling
includes TOP_STAPLE then
begin
document_require-
ments.stapling : =
BOTTOM_STAPLE;
set flag for 180
degree
global image
rotation
end;
else
document_require-
ments.stapling : =
NO_STAPLE;
return FALSE
end
end;
LEFT_STAPLE:
if marking_engine_capa-
bility.stapling
does not include LEFT_STAPLE
then
begin
document_require-
ments.stapling : =
NO_STAPLE;
return FALSE
end
end; (case)
return TRUE
end; {procedure is_staple_possible}
```

This routing first determines whether the stapling requirements of the document is "no staples" by examining the document requirements data structure illustrated in FIG. 3A. As illustrated in FIG. 3A, the staple structure indicates how, when and at what location stapling should occur. If the routine discovers that no stapling is required, then the stapling_is_possible value is returned as true. Next the system examines the printer capability data structure to determine whether it indicates that stapling is not possible. If the marking engine data structure indicates that stapling is not possible, the system executes a case type procedure whereby the document requirement is examined to determine whether the document requires right, saddle, middle, top, bottom or left stapling. If the marking engine does not include right stapling and right stapling is called for, the procedure sets a flag for rotating the document 180# and sets the stapling in the document requirements data structure for left stapling. If the procedure determines that the marking engine is not capable of saddle stapling and the document calls for saddle stapling, then the document requirements structure is set to no stapling. This settling to no stapling occurs for middle and top stapling whenever these are specified and the marking engine data structure indicates that middle and top stapling are not possible. If the document requirements data structure indicates that bottom stapling is required and the marking engine capabilities does not include bottom stapling, the system executes a procedure that sets a flag for rotating the image 180# if the marking engine is capable of performing top stapling otherwise the documents requirements data structure portion associated with stapling is set for no stapling. The system also determines whether left stapling is required by the document and sets the document stapling data structure to no staples when left stapling is not possible by the marking engine.

The procedure for determining whether duplexing is possible and correcting any mismatch is illustrated below:

```
procedure
is_duplex_possible()
begin
if document_require-
ments.simplex_or_duplex = SIMPLEX then
return TRUE;
{the job wants duplex, can the marking
engine do it}
if marking_engine_capa-
bility.simplex_or_duplex = SIMPLEX then
begin
document_require-
ments.simplex_or_duplex = SIMPLEX;
return FALSE
end;
return TRUE
end; {procedure is_duplex_possible}
```

This procedure determines the document requirements and then if the marking engine is not capable of duplex operations sets the documents requirements structure for simplex or duplex to simplex copying.

The offset checking and correction procedure as set forth below is very similar to the is duplex printing possible procedure.

```
procedure
is_offset_possible()
begin
if document_requirements.offset_stacking
```

```
= NO_JOB then
return TRUE;
{the job wants offset stacking, can the
 marking engine do it}
if marking_engine_capa-
bility.offset_stacking = NO_JOB then
begin document_require-
ments.offset_stacking: = NO_JOB;
return FALSE
end
else
return TRUE
end; {procedure is_offset_possible}
```

As in the previous procedure at first a determination is made as to the requirements of the document and if the document requires offset stacking, the capability of the marking engine is compared and if no match occurs, the document requirements is set for no offset spacing.

The fold determination procedure set forth below is also very similar.

```
procedure
is_fold_possible()
begin
if marking_engine_capability.folding =
document_requirements.folding then
return TRUE
else
begin
document_requirements.folding: =
NO_FOLD;
return FALSE
end
end; {procedure is_fold_possible}
```

This procedure also checks the document requirements data structure for folding and determines whether folding is required. If required, the capability of the marking engine is compared and the document data structure is set to no folding if the marking engine is not capable of folding.

The procedure which finds a matching paper between each of the paper requirements of the document requirements data structure is illustrated below:

```
procedure
find_matching_paper (desired_paper: paper_structure
)
begin
var
best_paper: paper_structure;
current_match,
best_match_so_far: integer;
best_match_so_far: = MAX_INT;
best_paper: = NO_MATCHING_PAPER;
for current_available_paper in set of all
available paper types do
begin
current_match: =
paper_match(
current_available_paper,
desired_paper);
if current_match = PERFECT_MATCH then
return current_available_paper
else
if (current_match <
best_match_so_far)
begin
best_paper: =
current_avail-
able_paper;
best_match_so_far: =
current_match
```
```
end;
end; {for}
return best_paper
end; {procedure find_matching_paper}
```

The above procedure first sets the best match so far variable and the best paper variable and then for the current available paper in the set of all available papers executes the paper match procedure discussed below to set the value of the current match. If the current match variable returned by the paper match procedure is equal to a perfect match, then the system returns with the current available paper as the paper specified in the document requirement structure. Otherwise, the system compares the current match with the best match so far and if the current match is a better match, then the variables are set to the currently tested paper.

The paper match procedure which determines the best available match between the color of the paper and the paper type is illustrated below:

```
procedure
paper_match (current_available_paper, desired_paper:
paper_structure)
begin
var
color_mismatch,
type_mismatch: integer;
if desired_paper.color =
current_available_paper.color then
color_mismatch: = 0
else
if desired_paper.color ! = WHITE and
current_available_paper.color =
WHITE then
color_mismatch: = 2
else
if desired_paper.color = WHITE
and current_avail-
able_paper.color ! = WHITE
then
color_mismatch: = 3
else
color_mismatch: = 1
if current_available_paper.type =
desired_paper.type then
type_mismatch: = 0
else
if desired_paper.type = PLAIN) and
current_available_paper.type ! =
PLAIN then
type_mismatch: = 3
else
if desired_paper.type ! = PLAIN)
and current_avail-
able_paper.type = PLAIN
then type_mismatch: = 1
else
type_mismatch: = 2
mismatch_magnitude: =
(difference in paper dimensions *
DIMENSION_SCALE_FACTOR) +
(difference in paper weights *
WEIGHT_SCALING_FACTOR) +
(color_mismatch *
COLOR_SCALING_FACTOR) +
(type_mismatch * TYPE_SCAL-
ING_FACTOR);
return mismatch_magnitude
end; {procedure paper_match}
```

This procedure first determines an amount of color mismatch by comparing the desired paper to the paper in the stocking tray. This procedure determines dimension mismatch by summing the dimensions of the desired paper, summing the dimensions of the stocked paper, determining a difference between the sums and multiplying by a scale factor, weight mismatch based on a difference in weights and a magnitude of the color mismatch as et forth in table 1 below:

TABLE 1

|      |                   | Want White | Non-white |
|------|-------------------|------------|-----------|
| Have | White             | 0          | 2         |
|      | Another Non White | 3          | 1         |

In this table if the user wants white paper and white paper is available the color mismatch variable is set to zero. If the user wants non-white paper and only white paper is available, the color mismatch variable is set to two. If the user wants white and only a non-white paper is available, when the mismatch is set to three and if the user wants non-white and another non-white paper is available, the system sets the color mismatch variable to one. Of course, if the desired paper color and the current available paper color match then the mismatch is set equal to zero. The paper type comparison procedure is very similar and essentially performs the function illustrated in table 2 below:

TABLE 2

|      |                   | Want Plain | Non-Plain |
|------|-------------------|------------|-----------|
| Have | Plain             | 0          | 1         |
|      | Another Non-Plain | 3          | 2         |

Once the magnitude of the color and type mismatches are determined, a mismatch magnitude is determined by summing the product of the difference in paper dimensions times a dimension scale factor, the difference in paper weights times a weight scaling factor, the difference in color match times a color scaling factor and the difference in type mismatch times a type scaling factor. This will produce a mismatch magnitude which is used by the find matching paper procedure previously discussed to determine the best match between the desired paper and the paper available in the printer. It is preferred that the dimension scaling factor equal 1, the weight scaling factor equal 1, the color scaling factor equal 3, and the type scaling factor equal 1 although other scale factors are acceptable. The scale factors provide a ranking of the importance of that particular characteristic to a user. The above system of determining the mismatch magnitude is not complicated and works well for a printer with only a few paper supply trays. If a printer has more supplies, such as 5 or 10, and is therefore capable of stocking a variety of colors or types of paper other matching strategies could be used. For example, the colors of the papers could be put on an intergerized wheel with each color of paper receiving a different integer value. The integer values for the desired and available papers could be subtracted to find color mismatch magnitudes.

The preferred data structures, as illustrated by FIGS. 3A and 3B include not only direct values for the capabilities and requirements, such as simplex_or_duplex but pointers to data structures which provide more detail such as the pointer from the top node 100 (120) in the data structure to the staple node 102 (122) which defines stapling. The offset or folding node 104 (124) also defines how and when to fold. Each of the types of paper includes a separate node 106 (126) which defines the characteristics of the paper and pointers to nodes 108 (128) and 110 (130) which define color and type. The requirements data structure is conventionally loaded from the document header previously discussed where the "Requirements" section loads the duplex, offset, stapling and folding fields with appropriate integers signifying the requirements selected by the user. The various body paper, cover, and tab tags, etc. are used to load the paper structures with the variables as previously mentioned. It is preferable, that the fields of the data structures are filled with integers representing the various requirements and capabilities. If is preferred that power of 2 be used for such capability, thereby allowing boolean tests to be made for a capability using AND and OR bit-wise operators. For example, for stapling, no staple=0, left staple=1, right staple=2, saddle staple=4, top staple=8, middle staple=16 and bottom staple=32; for folding no fold=0, Z fold=1, gate fold=2, right gate fold=4, left gate fold=8, letter fold=16 and X fold=32; for offsetting no jog=0, jog position 1=1, jog position 2=2 and jog alternate=4; for mismatch strategy of strict=0 and mismatch strategy of do the best you can=1; for simplex=0 and duplex=1; and for when never=0, page end=1, set end=2, job end=4, set start=8 and job start≦16. The header for the job can be parsed and used to construct or complete the requirements data structure or complete the preferred or any other document structuring convention using the UNIX tool LEX and YACC.

As can be seen by the above discussion the present invention automatically matches the capabilities of the printer with the requirements of the print job as that a print job is executed which is as close a match as possible to the print job specified by the print job submitter. Thus, the present invention allows a printer to function in a more unattended fashion than a traditional printer because the printer is able to make choices as to what characteristics of the printer best satisfy the requirements of an incoming job. The system takes the job requirements and selects from among the resources presently available within the printer those that best match the requirements.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, it is possible for all the possible job requirements and all the possible combinations of printer configurations to be used to create a table addressable by the current printer configuration and the printer job requirements, where the output would be the best possible match. This approach while it would be very fast would be memory wasteful as compared to the algorithm method described above.

What is claimed is;

1. A method of printing including matching print job requirements of a user sent from a remote location along with a print document to printer capabilities, said method comprising the steps of:

(a) determining whether a mismatch exists between the job requirements from the remote location and the printer capabilities;
(b) determining the best match between the job requirements from the remote location and the printer capabilities when the mismatch exists; printing the document unattended by the user, responsive to the best match;
(c) setting the job requirements to the best match when the mismatch exists, including:
  (c1) setting job paper requirements to the best paper match;
  (c2) setting job stapling requirements to no stapling when stapling does not exist in the printer capabilities;
  (c3) rotating the image and setting job stapling requirements to an available stapling capability when rotation and stapling will satisfy the job stapling requirements;
  c4) setting job duplex requirements to simplex when duplex capability does not exist in the printer capabilities;
  (c5) setting job offset requirements to no offset when offset capability does not exist in the printer capabilities; and
  (c6) setting job folding requirements to no folding when folding capability does not exits in the printer; and
(d) printing the document unattended by the user responsive to the best match.

2. A method of printing including matching print job requirements printer capabilities where a document and the print job requirements are sent from a remote location by a user, said method comprising the steps of:
(a) determining whether a mismatch exists between the job requirements from the remote location and the printer capabilities;
(b) determining the best match between the job requirements from the remote location and the printer capabilities when the mismatch exists, comprising:
  (b1) determining for all paper supplies a mismatch magnitude of a mismatch between paper requirements and paper capability including:
    (i) determining a dimension magnitude of paper dimension differences, a weighty magnitude of paper dimension differences, a color mismatch magnitude of color differences and a type mismatch of type differences; and
    (ii) summing the dimension, weight, color mismatch and type mismatch magnitudes to obtain the mismatch magnitude; and
  (b2) selecting a one of the paper supplies with a smallest mismatch magnitude;
(c) allowing the operator to change the printer capabilities;
(d) setting the job requirements to the best match when the mismatch still exists, comprising:
  (d1) setting job paper requirements to the best paper match;
  (d2) setting job stapling requirements to no stapling when stapling does not edit in the printer capabilities:
  (d3) rotating the image and setting job stapling requirements to an available stapling ability when rotation and stapling will satisfy the job stapling requirements;
  (d4) setting job duplex requirements to simplex when duplex capability does not exist in the printer capabilities;
  (d5) setting job offset requirements to no offset when offset capability does not exit in the printer capabilities; and
  (d6) setting job folding requirements to no folding when folding capability does not exist in the printer; and
(e) printing the document, unattended by the user, responsive to the best match.

* * * * *